United States Patent Office 3,519,363
Patented July 7, 1970

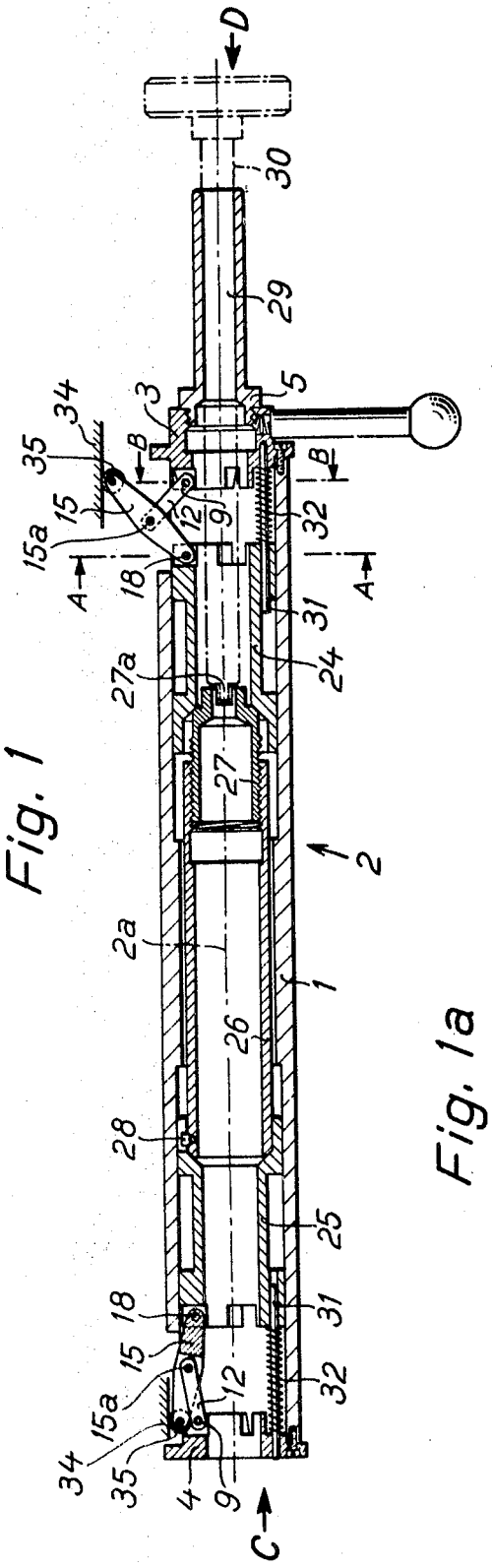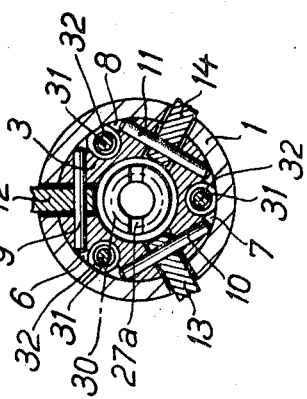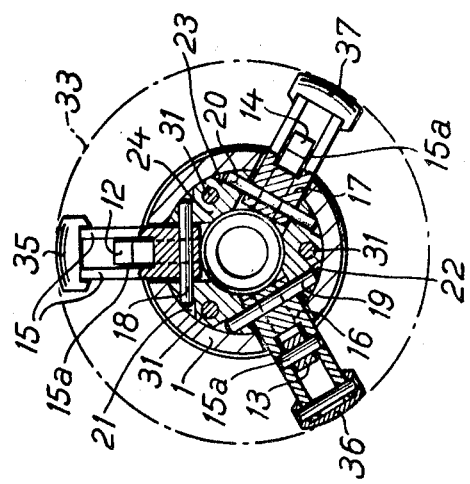

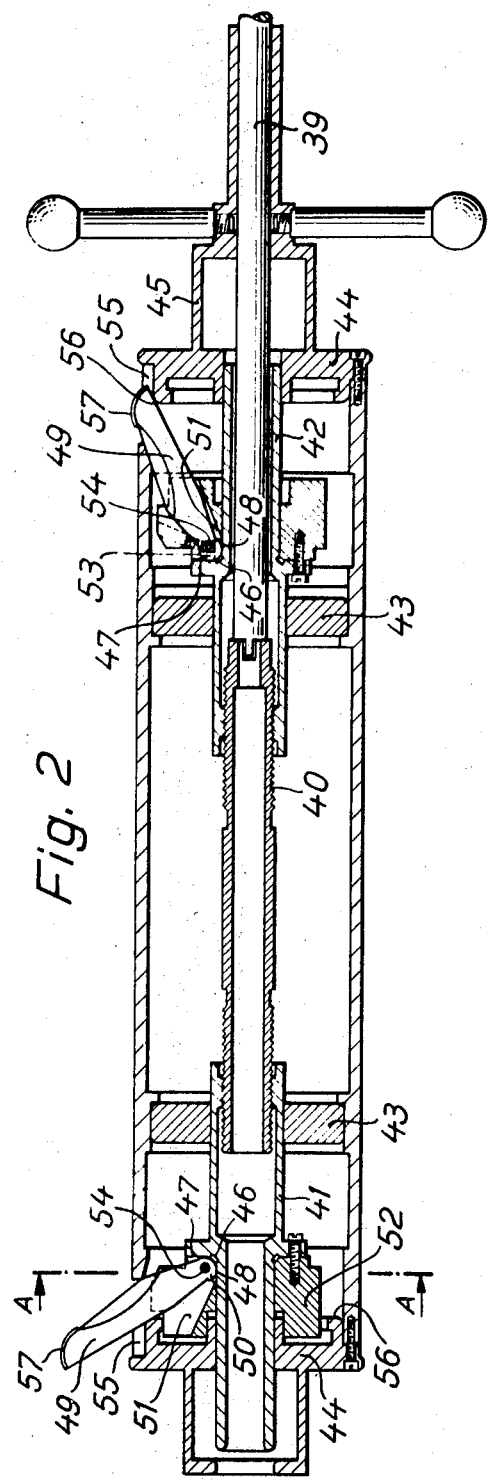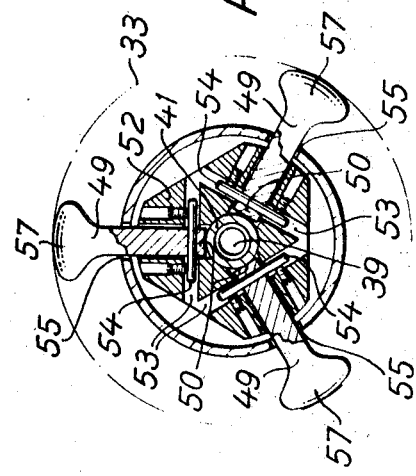
INVENTORS
HANS RICHTER
OTTO SÄNGER
By Krafft & Wells
ATTORNEYS

3,519,363
APPARATUS FOR INSERTION INTO A BORE TO SUPPORT AN OPTICAL MEASURING OR INSPECTING INSTRUMENT
Hans Richter, Meppen, and Otto Sanger, Wetzlar, Germany, assignors to Ernst Leitz G.m.b.H., Wetzlar, Germany
Filed Apr. 11, 1968, Ser. No. 720,620
Claims priority, application Germany, Apr. 18, 1967, L 56,281
Int. Cl. G01n 21/04
U.S. Cl. 356—241
4 Claims

ABSTRACT OF THE DISCLOSURE

The disclosed apparatus comprises a tube which is adapted to accept optical inspecting means and which is to be inserted into the barrels to be inspected. Inside the barrels the tube axis is brought into alignment with the barrel axis and is clamped in this position.

To this end, three feeler arms are provided at the front and at the rear end of the tube. Said feeler arms are with one end pivotably connected in pairs of three and spaced by approximately 120° from each other to two bushes which are disposed axially displaceable inside the tube.

The feeler arms extend outwards through suitable slots in the tube wall.

Means are provided for displacing said bushes in said tube in opposite directions to each other, thereby causing said feeler arms to swing outwardly until all arms abut evenly against the surface of the barrel bore. Said displacing means are operable from outside the barrel.

A support member is positively connected to one end of the tube. This member is adapted to accept and support an optical measuring instrument.

CROSS-REFERENCE TO RELATED APPLICATIONS

Applicants claim priority under 35 USC 119 for application No. L 56,281, filed Apr. 18, 1967 in the Patent Office of Germany.

Reference is further made to German Pat. No. 712,990 issued Oct. 2, 1941 and No. 852,353 issued Nov. 22, 1951.

BACKGROUND OF THE INVENTION

Field of the invention

The present invention relates to a device which is inserted into a gun barrel where it provides a centrical support for an inspecting instrument, e.g. a telescope.

Description of the prior art

Inspecting gun barrels for the straightness of their bore requires a telescopic sight that has to be brought into alignment with the axis of the barrel. To this end, a support member is introduced into the barrel where its axis is made to coincide with the barrel axis. On said member the telescopic sight is then coaxially mounted so as to ensure proper coincidence of barrel axis and optical axis of the telescope.

As a support member there is already known a device which consists of a tube as the main body having two radially extending stationary pins at both ends thereof. Said pins being spaced by 90° from each other. A third pin is arranged opposite to and in the middle between said stationary pins and is displaceable in radial direction. Setting means are provided for pushing said displaceable pin in an outward direction, thereby bringing all three pins at both ends of the tube to abut against the inner barrel surface, thus clamping the tube inside the barrel.

This device, however, can only be used with barrels that have an exact cylindrical bore. Should the bore not be cylindrical no proper abutment of the pins against the inner barrel surface can be achieved and, as a consequence, the axis of the support device and the barrel axis will not coincide.

Moreover, the device can only be used for inspecting barrels of one particular diameter, since the displaceable pin is displaceable only for more convenient insertion of the device into the barrel, not for variation of the diameter of the circle at which clamping action takes place.

According to another known device the tube is provided with four equidistantly spaced pressure members which are resiliently mounted and are movable radially in an outward direction. Two ring-shaped elements are provided, each one thereof being adapted to displace two opposite pressure members. A spring between said elements supplies the force with which the members abut against the inner barrel surface. (Disclosed in German Pat. No. 712,990.)

This device is free from the disadvantages of the first mentioned apparatus as regards the axial displacement. However, other disadvantages are inherent in this device which result from the resilient abutment of the pressure members against the barrel surface. If the spring-supplied pressure is chosen too small, the weight of the device itself plus the weight of the optical inspecting apparatus causes a deviation of the optical axis from the axis of the bore. On the other hand, if the pressure is chosen too great this will render the process of inserting the device into the barrel more difficult. Besides, the surface of the bore itself can easily be damaged and, further, the clamping range, i.e. the difference in diameter of the bores wherein clamping can be effected is only very small. If a greater range is to be covered a lengthy exchange of pressure members is required.

For smaller calibers an inpecting apparatus is disclosed in German Pat. No. 852,353. This apparatus is centered by means of a spreader or expanding cartridge. The resilient sleeves thereof can be pushed in an outward direction by an axially displaceable cam. However, here again the clamping range is extremely limited. The latter depending directly on the difference between the front and rear end diameter of the cone that is forced into the cartridge.

SUMMARY OF THE INVENTION

It is therefore an object of the invention to provide a novel apparatus for the inspection of gun barrels which is reliable in operation and which has a considerably larger clamping range than the prior art devices.

It is a further object to provide an apparatus which centers automatically inside of the gun barrel, even if the bore diameter is different at different barrel portions.

These objects are attained by providing three feeler arms at the front end and at the rear end of a hollow tube. At both ends of said tube said three arms are pivotably mounted at 120° angular distance from each other, all arms being swingable in the direction of the tube axis. Inside the tube are two bushes axially displaceable in directions opposite to each other. One bush is arranged at the front end and the other one at the rear end of the tube. Each bush is in driving engagement with this pair of three feeler arms which is mounted next to it. The driving engagement exists in such a way that the free end portions of each pair of feeler arms are moved in an outward (or inward) direction upon any axial displacement of the bush. If the bush is moved in a direction where the feeler arms are caused to swing outwards all feeler arm ends will finally rest evenly against the inner barrel surface in a position where the tube axis automatically coincides with the axis of the barrel. It should be noted that this effect takes place regardless whether the bore of the barrel is cylindrical or elliptical, since the equidistant arrangement of the three feeler arms in one pair compensates for any deviation of the barrel bore from the proper cylindrical shape.

Both bushes are interconnected and, at the same time, are acted upon by a hollow connection rod by means of which axial displacement of both bushes may be achieved. This displacement occurs always in opposite direction to each other and it is of particular significance that one bush may still be displaced even if the other bush is already stopped in its movement by its feeler arms abutting against the inner barrel surface. The connection of both bushes is therefore a compensating connection. Should the bore be exactly cylindrical through its entire length the feeler arms of both pairs will abut at the same moment against the inner barrel surface and no compensating action will be required. However, should the bore be conical, should, for example, the bore diameter at the barrel end be greater than at the middle portion of the barrel, then the feeler arms in the middle portion will abut first and will thus stop the movement of its bush. The compensating connection will then cause the other bush to be displaced further until the other pair of feeler arms also abuts against the inner surface of greater diameter.

For operation of the connection rod from outside the barrel the rod is provided with a radial slot at its outer end. A driver member is inserted into the slot in a screw driver-like manner so that the rod is turnable from the outside.

The particular advantage of the invention over the prior art devices rests in the fully automatic adjustment of the three feeler arms at the front end and at the rear end of the tube to the respective bore diameters, as described above. After clamping the tube axis will always coincide with the bore axis, even if the bore is not cylindrical but conical.

The invention will be more readily comprehended from the following description when taken in conjunction with the appending drawings wherein two embodiments of the invention are illustrated by way of example. In the drawings:

FIG. 1 shows a longitudinal sectional view of a first embodiment of a support member for an inspecting apparatus for gun barrels, FIG. 1a is a cross sectional view in the direction of the arrows A of FIG. 1, FIG. 1b is a cross sectional view in the direction of the arrows B of FIG. 1, FIG. 2 shows a longitudinal sectional view of a second embodiment of a support member for an inspecting apparatus for gun barrels, FIG. 2a is a cross sectional view in the direction of the arrows A of FIG. 2.

DESCRIPTION OF THE PREFERRED EMBODIMENT

Referring to FIGS. 1, 1a and 1b the cylindrical basic body 1 of the tube 2 carries at both ends annular closure caps 3 and 4. A cartridge 5 is detachably inserted into the closure cap 3. It can be replaced by a cartridge having a different diameter and serves as a support member to receive a measuring instrument (not illustrated), for example a sighting telescope. Three bores 6, 7 and 8 (FIG. 1b) situated at 120° in relation to one another and in each case at right-angles to the axis 2a of the holder tube are provided in the cap 3, and bolts 9, 10 and 11 are inserted in them. The bolts serve to mount the levers 12, 13, 14 which cooperate with the feeler arms 15, 16 and 17 at three articulation points 15a and thus form three toggle lever arrangements having equal lever arms. The feeler arms 15, 16 and 17 are mounted in the same manner as the levers 12, 13 and 14 in bolts 18, 19 and 20 which are inserted in bores 21, 22 and 23 in the bush 24 (FIG. 1a). The same toggle lever arrangements are also situated in the region of the cap 4. The respective bearing bush is here designated by 25. The two bushes are adjustable in the axial direction, but oppositely to one another, by means of threaded shaft portions 26 and 27 situated between them. While the threaded shaft portion 26 is rectilinearly guided by means of a pin slot connection 28, the shaft portion 27, which at one end has a slot 27a can be turned by a driver 30 detachably insertable into the bore 29 in the cartridge 5.

To maintain connection of the parts 24–27 and in order to prevent unintentional opening of the toggle lever arrangements, springs 32 are provided which bear against the caps 3 and 4.

At the ends of the feeler arms 15, 16 and 17 which form the measuring circle 33 and bear against the inner wall 34 of the barrel, there are attached barrel-shaped centring members 35, 36 and 37 the profile of which corresponds to the radius of the smallest gun barrel diameter to be tested and the length of which is selected so that at least two lands of a rifled barrel can be reliably covered.

The insertion of the apparatus and the measuring operation are carried out as follows:

The two threaded shaft portions 26, 27 must first be adjusted by means of the driver 30 so that the feeler arm ends form a diameter which is smaller than the bore to be tested. The tube 2 can now be inserted into the gun barrel 34. By turning the driver 30 the threaded shaft portions 26, 27 are moved and their movement is transmitted to the bushes 24, 25. The feeler arms 15, 16 and 17 are thus rocked in longitudinal planes parallel to the tube axis 2a in such a manner that the centering members 35, 36 and 37 move in a straight line in the radial direction until they bear against the inner wall 34 of the gun barrel. The distance between the two measuring circles is thus maintained during the adjusting operation. Through the independent adjustability of the adjusting members (threaded shaft portions and bushes) compensation is provided for unequal barrel diameters in the two measurement planes. If the centering members of one measuring circle have already come into contact, their axial displacement alone, during the further rotation of the threaded shaft portions 26, 27, then effects the opening of the feeler arms associated with the bush 24 in the other measuring plane. An extreme adjustment of this type is illustrated in FIG. 1.

After all the centering members have come into contact with the inner wall of the gun barrel, their pressing force being adjustable by an overload clutch provided in the driver 30 but not illustrated in the drawing, the driver is removed in order to permit viewing through the entire arrangement.

Measuring means, for example telescopes, can now be attached to the hollow cartridge 5 in such a manner that sighting is possible through the tube both in the direction of the arrows C and D.

In the embodiment illustrated in FIG. 2, the driver 39 is inserted into a hollow connection rod 40, which is operatively connected to the bushes 41 and 42. Each of these bushes is guided in two bearing members 43 and 44, the outer of which form a hollow plug 45. Since both measuring planes are similarly arranged, reference is made hereinbelow to only one of them for the sake of simplicity.

The bush 41 has an annular recess 46, whereby, viewed in cross-section, two bearing surfaces 47 and 48 lying at right-angles to one another are formed. These two bearing surfaces form a bearing point for three feeler arms 49 offset by 120° in the same manner as in the example previously described and having a cylindrical running surface 50. In order to support and guide the feeler arms, a ring 52 provided with corresponding grooves 51 and fastened on the bush 41 is provided, bores 53 lying at right-angles to the tube axis 2a being provided in said ring to receive a pin 54 mounted in the cylinder axis of the feeler arms. The clearance of the pin mounting is so great that it has no influence on the determining mounting of the feeler arms on the support surfaces 47 and 48.

The feeler arms 49 project out of slots 55 in the tube and are supported by the bearing member 44 which at the same time serves as closure cap and which is provided for the bush 41, the operative bearing surface 56 of which is rounded. The feeler arms accordingly have linear contact, and optionally, depending on the construction of the other two surfaces 48 and 56, punctiform and linear contact with the plane surface 47.

The feeler arm ends 57 forming the measuring circle are constructed as toric surfaces in the same manner as in the example previously described.

During the rotation of the threaded hollow connection rod 40 the two bushes 41 and 42 are pushed outwards. In consequence of the supporting of the feeler arms, the ends thereof can move outwards until they bear against the inner wall of the barrel. Here again there is automatic compensation for differences in diameter of the barrel bore.

Various modifications may be made to the above described embodiments without departing from the scope of the invention. For example, in the arrangement of FIG. 2, the articulation pins 54 can be omitted in a suitably modified construction. The positioning of the articulation points and feeler arm supports can be reversed i.e. the bushes could be arranged to provide the feeler arm supports instead of the articulation points.

Through the abovedescribed adjusting mechanism for the feeler arms the effect is achieved that in the clamping operation there is a balancing of forces and path, that is to say an adaptation of the two measuring circles to different diameters of barrel bores, for example when the barrel bore is conical. When the feeler arm ends belonging to a measurement base line have come to bear against the inner wall of the barrel, the adjusting operation (axial displacement of the bushes) continues until the feeler arm ends of the second measuring circle have also reached the measuring position with a pre-determined pressure force.

What is claimed is:

1. An apparatus for inspecting and measuring gun barrels, said apparatus comprising in combination a tube, said tube being adapted to be inserted into a gun barrel;
   two bushes being centrically disposed inside of said tube and being axially displaceable therein;
   three feeler arms being pivotably connected to each of said bushes at approximately 120° angular distance from each other so as to be swingable outwards through slots in said tube wall, when said bushes are displaced;
   hollow connection means drivingly connecting said two bushes, said means being turnable, thereby displacing said bushes in opposite directions;
   removable driving means being introduced through one of said bushes, said means being adapted to turn said connection means and being operable from the outside of the barrel;
   a support member being rigidly fastened to one end of said tube, said member being adapted to accept and support an optical measuring instrument.

2. An apparatus for inspecting and measuring gun barrels, said apparatus comprising in combination a tube (2) having three axially extending slots at each end spaced at approximately 120° angular distance from each other, said tube being adapted to be inserted into a gun barrel;
   two bushes (24, 25) being centrically guided inside of said tube and being axially displaceable therein;
   three feeler arms (15, 16, 17) being pivotably connected to each of said bushes at approximately 120° angular distance from each other so as to be swingable outwards through said slots in said tube when said bushes are displaced, the axis of said feeler arms extending at right angles to the axis of said tube;
   annular closure caps (3, 4) covering the ends of said tube and being positively secured thereto;
   levers (12, 13, 14) of which each one is pivotably connected to the middle portion of one feeler arm, the other end of each lever arm being pivotably connected to said closure caps, thereby, in combination with said feeler arm, forming a toggle lever arrangement;
   two hollow shaft portions (26, 27) threaded into each other, said shaft being inserted between said two bushes;
   spring means (32) acting upon said bushes, thereby urging said bushes into abutting contact with the front and the rear end of said shaft;
   catch means (27a) being provided at the end of one of said shaft portions and being adapted to receive the matching end portion of a suitable driving means;
   guide means (28) being provided between the other shaft portion and the abutting bush whereby rotation of said shaft portion is prevented;
   removable driving means (30), said means being adapted to be inserted into said catch means and to rotate said shaft portion upon operation from outside of the barrel;
   a cartridge (5) being concentrically secured to one of said annular closure caps, said cartridge being adapted to accept and support a noptical measuring instrument;

3. An apparatus for inspecting and measuring gun barrels, said apparatus comprising in combination a tube having three axially extending slots at each end spaced at approximately 120° angular distance from each other, said tube being adapted to be inserted into a gun barrel;
   two bushes (41, 42) being centrically guided inside of said tube and being axially displaceable therein, said bushes having three axially extending grooves (51) each, spaced at approximately 120° angular distance from each other, the walls of each groove providing two abutting surfaces (47, 48), one extending in parallel to the axis, the other perpendicularly thereto, said bushes further being provided with internal threads of opposite lead;
   three feeler arms (49) being connected to each bush, each feeler arm being loosely journaled in one of said grooves;
   two annular closure caps (44) covering the ends of said tube and being positively secured thereto, said caps being provided with an annular and centrical rim (56) adapted to support the middle portion of said feeler arms;
   a hollow connection rod (40) having externally threaded end portions of opposite lead to match said internal threads in said bushes, said connection rod being threaded into said bushes;

catch means being provided at one end of said connection rod and being adapted to receive the matching end portion of a suitable driving means;

removable driving means (39), said means being adapted to be inserted into said catch means and to rotate said connection rod upon operation from outside of the barrel;

a cartridge (45) being concentrically secured to one of said annular closure caps, said cartridge being adapted to accept and support an optical measuring instrument.

4. An apparatus for inspecting and measuring gun barrels according to claim 1, wherein the free end portions of said feeler arms are provided with pivotable centring elements having toric surfaces, said surfaces being sufficiently wide to cover in rifled barrels one rifle and two adjacing lands.

References Cited

FOREIGN PATENTS 110,148   3/1925   Switerland.

RONALD L. WIBERT, Primary Examiner

O. B. CHEW, II, Assistant Examiner

U.S. Cl. X.R.

33—46; 95—11